US011915269B2

(12) United States Patent
Ericson et al.

(10) Patent No.: US 11,915,269 B2
(45) Date of Patent: Feb. 27, 2024

(54) SYSTEM AND METHOD FOR TOKENIZING OFFERS

(71) Applicant: PayPal, Inc., San Jose, CA (US)

(72) Inventors: Braden Christopher Ericson, San Jose, CA (US); Harshal Ulhas Deo, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 17/336,209

(22) Filed: Jun. 1, 2021

(65) Prior Publication Data
US 2021/0350415 A1 Nov. 11, 2021

Related U.S. Application Data

(63) Continuation of application No. 15/695,473, filed on Sep. 5, 2017, now Pat. No. 11,023,929.

(51) Int. Cl.
| G06Q 30/00 | (2023.01) |
| G06Q 30/0251 | (2023.01) |
| G06Q 30/0273 | (2023.01) |
| G06Q 30/0272 | (2023.01) |
| G06Q 30/0235 | (2023.01) |
| G06Q 30/0207 | (2023.01) |

(52) U.S. Cl.
CPC ..... *G06Q 30/0267* (2013.01); *G06Q 30/0222* (2013.01); *G06Q 30/0235* (2013.01); *G06Q 30/0239* (2013.01); *G06Q 30/0253* (2013.01); *G06Q 30/0272* (2013.01); *G06Q 30/0273* (2013.01)

(58) Field of Classification Search
CPC ........................... G06Q 30/0207–0277
See application file for complete search history.

(56) References Cited

U.S. PATENT DOCUMENTS

| 5,960,411 | A | * | 9/1999 | Hartman | ............ | G06Q 30/0635 |
| | | | | | | 715/962 |
| 6,223,215 | B1 | * | 4/2001 | Hunt | ...................... | H04L 67/142 |
| | | | | | | 709/224 |
| 7,680,899 | B1 | * | 3/2010 | Barnes | .................. | G06F 16/955 |
| | | | | | | 709/219 |
| 8,521,131 | B1 | * | 8/2013 | Ramalingam | ...... | G06Q 30/0259 |
| | | | | | | 455/410 |
| 9,767,467 | B2 | * | 9/2017 | Gebb | ................. | G06Q 30/0234 |
| 9,898,751 | B1 | * | 2/2018 | Barmish | ............ | G06Q 30/0222 |
| 10,032,182 | B1 | * | 7/2018 | Lee | ..................... | G06Q 30/0207 |

(Continued)

FOREIGN PATENT DOCUMENTS

WO WO-2015150749 A1 * 10/2015 ......... G06Q 30/0241

*Primary Examiner* — Luis A Brown
(74) *Attorney, Agent, or Firm* — HAYNES AND BOONE, LLP (57) ABSTRACT

Aspects of the present disclosure involve systems, methods, devices, and the like for tokenizing offers. The current disclosure presents a system and method that can present a tokenized offer for saving and retrieving from a digital wallet. The tokenized offer may be presented on a client site for selection by a user interested in taking advantage of the promotion without having to leave the current site. The current disclosure also presents a system that can retrieve the tokenized offer saved for use with a purchase. The tokenized offer may be automatically applied and on display at the merchant site and/or retrieved from the digital wallet.

20 Claims, 7 Drawing Sheets

(56) References Cited

U.S. PATENT DOCUMENTS

| | | | |
|---|---|---|---|
| 10,069,886 B1* | 9/2018 | Lundsgaard | H04L 65/60 |
| 10,380,585 B2* | 8/2019 | Harris | G06Q 20/34 |
| 2002/0133467 A1* | 9/2002 | Hobson | G06Q 20/04 |
| | | | 705/64 |
| 2003/0163787 A1* | 8/2003 | Hay | G06Q 30/06 |
| | | | 715/248 |
| 2004/0122736 A1* | 6/2004 | Strock | G06Q 30/0207 |
| | | | 705/14.31 |
| 2004/0193425 A1* | 9/2004 | Tomes | G10L 15/26 |
| | | | 704/E15.045 |
| 2005/0071230 A1* | 3/2005 | Mankoff | G06Q 30/0235 |
| | | | 705/14.15 |
| 2005/0075932 A1* | 4/2005 | Mankoff | G06Q 30/0258 |
| | | | 705/14.57 |
| 2005/0222846 A1* | 10/2005 | Tomes | H04L 12/66 |
| | | | 704/275 |
| 2006/0212355 A1* | 9/2006 | Teague | G06Q 30/0214 |
| | | | 705/14.19 |
| 2007/0198344 A1* | 8/2007 | Collison | G06Q 30/0207 |
| | | | 705/14.1 |
| 2009/0072020 A1* | 3/2009 | Hull | G06Q 20/227 |
| | | | 235/379 |
| 2009/0157511 A1* | 6/2009 | Spinnell | G06Q 90/00 |
| | | | 705/14.1 |
| 2010/0094689 A1* | 4/2010 | Fodor | G06Q 30/0207 |
| | | | 705/14.1 |
| 2010/0125510 A1* | 5/2010 | Smith | G06Q 20/425 |
| | | | 705/17 |
| 2011/0010238 A1* | 1/2011 | Postrel | G06Q 30/0207 |
| | | | 705/14.1 |
| 2011/0029383 A1* | 2/2011 | Engel | G06Q 30/0255 |
| | | | 705/14.69 |
| 2011/0112901 A1* | 5/2011 | Fried | G06Q 30/02 |
| | | | 705/14.49 |
| 2011/0208656 A1* | 8/2011 | Alba | G06Q 20/20 |
| | | | 705/65 |
| 2012/0066047 A1* | 3/2012 | Muthugopalakrishnan | |
| | | | G06Q 30/0225 |
| | | | 705/14.33 |
| 2012/0116861 A1* | 5/2012 | Dobyns | H04W 4/023 |
| | | | 705/14.34 |
| 2012/0158584 A1* | 6/2012 | Behren | G06Q 20/10 |
| | | | 705/41 |
| 2012/0158654 A1* | 6/2012 | Behren | G06Q 30/06 |
| | | | 707/769 |
| 2012/0245986 A1* | 9/2012 | Regan | G06Q 30/0226 |
| | | | 705/14.23 |
| 2012/0265590 A1* | 10/2012 | Mesaros | G06Q 30/08 |
| | | | 705/14.35 |
| 2013/0054336 A1* | 2/2013 | Graylin | G06Q 40/02 |
| | | | 705/21 |
| 2013/0079037 A1* | 3/2013 | Dobyns | H04W 4/029 |
| | | | 455/456.3 |
| 2013/0080235 A1* | 3/2013 | Wolfe | G06Q 30/0222 |
| | | | 705/14.26 |
| 2013/0132184 A1* | 5/2013 | Mutha | G06Q 20/204 |
| | | | 705/14.27 |
| 2013/0297543 A1* | 11/2013 | Treiser | G06Q 30/02 |
| | | | 706/45 |
| 2013/0304576 A1* | 11/2013 | Berland | G06Q 30/0236 |
| | | | 705/14.53 |
| 2014/0081720 A1* | 3/2014 | Wu | G06Q 20/20 |
| | | | 705/14.1 |
| 2014/0081745 A1* | 3/2014 | Cooke | G06Q 30/0224 |
| | | | 705/14.49 |
| 2014/0089101 A1* | 3/2014 | Meller | G06Q 30/0269 |
| | | | 705/14.66 |
| 2014/0172551 A1* | 6/2014 | Desai | G06Q 30/0255 |
| | | | 705/14.47 |
| 2014/0180826 A1* | 6/2014 | Boal | G06Q 30/0207 |
| | | | 705/14.66 |
| 2014/0310076 A1* | 10/2014 | Liberty | G06Q 30/0269 |
| | | | 705/14.1 |
| 2014/0324690 A1* | 10/2014 | Allen | H04M 3/5183 |
| | | | 705/41 |
| 2015/0120411 A1* | 4/2015 | Kneen | G06Q 30/0211 |
| | | | 705/14.13 |
| 2015/0120472 A1* | 4/2015 | Aabye | G06Q 20/40 |
| | | | 705/16 |
| 2015/0127547 A1* | 5/2015 | Powell | G06Q 20/382 |
| | | | 705/67 |
| 2015/0134436 A1* | 5/2015 | Lambert | G06Q 20/387 |
| | | | 705/14.26 |
| 2015/0161642 A1* | 6/2015 | Pastore | G06Q 30/0224 |
| | | | 705/14.25 |
| 2015/0186871 A1* | 7/2015 | Laracey | G06Q 30/0226 |
| | | | 705/41 |
| 2015/0254638 A1* | 9/2015 | Bondesen | G06Q 20/36 |
| | | | 705/41 |
| 2015/0254647 A1* | 9/2015 | Bondesen | G06Q 20/385 |
| | | | 705/41 |
| 2015/0254656 A1* | 9/2015 | Bondesen | G06Q 20/36 |
| | | | 705/41 |
| 2015/0254699 A1* | 9/2015 | Bondesen | G06Q 20/20 |
| | | | 705/14.17 |
| 2015/0302486 A1* | 10/2015 | Foufas | G06Q 30/0273 |
| | | | 705/14.25 |
| 2015/0332264 A1* | 11/2015 | Bondesen | G06Q 20/3821 |
| | | | 705/44 |
| 2016/0071094 A1* | 3/2016 | Krishnaiah | G06Q 20/363 |
| | | | 705/66 |
| 2016/0092902 A1* | 3/2016 | Storry | G06Q 30/0633 |
| | | | 705/14.26 |
| 2016/0180421 A1* | 6/2016 | Wegner | G06Q 50/01 |
| | | | 705/26.4 |
| 2016/0225004 A1* | 8/2016 | Cohen | G06Q 30/0207 |
| 2017/0195879 A1* | 7/2017 | Jones-McFadden | |
| | | | G06Q 20/227 |
| 2017/0228752 A1* | 8/2017 | Buckman | G06Q 30/0267 |
| 2017/0236143 A1* | 8/2017 | Code | G06Q 20/387 |
| | | | 705/14.27 |
| 2017/0270557 A1* | 9/2017 | Maenpaa | G06Q 20/363 |
| 2017/0272948 A1* | 9/2017 | Holtmanns | H04W 12/06 |
| 2018/0124477 A1* | 5/2018 | Qu | H04N 21/8547 |
| 2018/0144362 A1* | 5/2018 | Ketchpaw | H04L 67/53 |
| 2018/0189817 A1* | 7/2018 | Barak | G06Q 30/0635 |
| 2018/0232768 A1* | 8/2018 | Barak | G06Q 30/0235 |
| 2018/0232769 A1* | 8/2018 | Barak | G06Q 30/0235 |
| 2018/0232793 A1* | 8/2018 | Cognet | G06Q 30/04 |
| 2018/0293574 A1* | 10/2018 | Sooudi | G16H 20/10 |
| 2019/0073696 A1* | 3/2019 | Ericson | G06Q 30/0235 |
| 2019/0238515 A1* | 8/2019 | Dodd | H04L 63/0407 |

* cited by examiner

SYSTEM AND METHOD FOR TOKENIZING OFFERS

RELATED APPLICATIONS

This application is a continuation of U.S. application Ser. No. 15/695,473, filed Sep. 5, 2017, now U.S. Pat. No. 11,023,929, which is hereby incorporated by reference in its entirety.

TECHNICAL FIELD

The present disclosure generally relates to communications between devices, and more specifically, to the communication between devices for receiving tokenized offers.

BACKGROUND

Rapid advancements in technology and communications have led to the ubiquitous use of wireless electronics. As such, today's society has grown to become heavily device reliant, with a need to be constantly connected. This reliance has led to the use of electronics to make monetary transactions for goods and services.

For example, consumers can now go to a home computer to purchase an item at an online store site. In some instances, the user can obtain special offers and promotions from these online stores while browsing a different site. Unfortunately, conventional systems generally require the user to leave the current site in order to obtain and use the promotion. However, a user may have an interest in remaining on the current site to continue reading, browsing, streaming, or other activity, at the moment. Thus, the promotion presented to the user, may be lost and possible sale for the merchant postponed or not completed. This loss of sale, offer, or promotion can lead to a loss of time (if redirected), money, as well as stress and frustration to a user. Therefore, it would be beneficial if a system were created that provides user with the ability to store and access such promotions at a later time.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for tokenizing offers. In one embodiment, a system is introduced that can present a tokenized offer for saving and retrieving from a digital wallet. The tokenized offer may be presented on a client site for selection by a user interested in taking advantage in the promotion without having to leave the current site. The tokenized offer may be presented in response to a verification that a customer meets restrictions and/or criteria set by a merchant. In another embodiment, a system is introduced that can retrieve the tokenized offer saved for use with a purchase. The tokenized offer may be automatically applied and on display at the merchant site and/or retrieved from the digital wallet.

Rapid advances in communications have made portable electronic devices, such as smartphones and tablets, part of everyday life. Among other things, these electronic devices can be used to browse the web and purchase goods and services. In some instances, the user may user the electronic device to browse the web or stream video, while in other instances, the user may be specifically looking to purchase an item. Oftentimes, however, a promotion for an item may appear at an inopportune time, when the user in not specifically searching and instead reading an article. In these instances, the user may find it difficult to leave the current site in order to take advantage of the current promotion presented.

Figure 1:
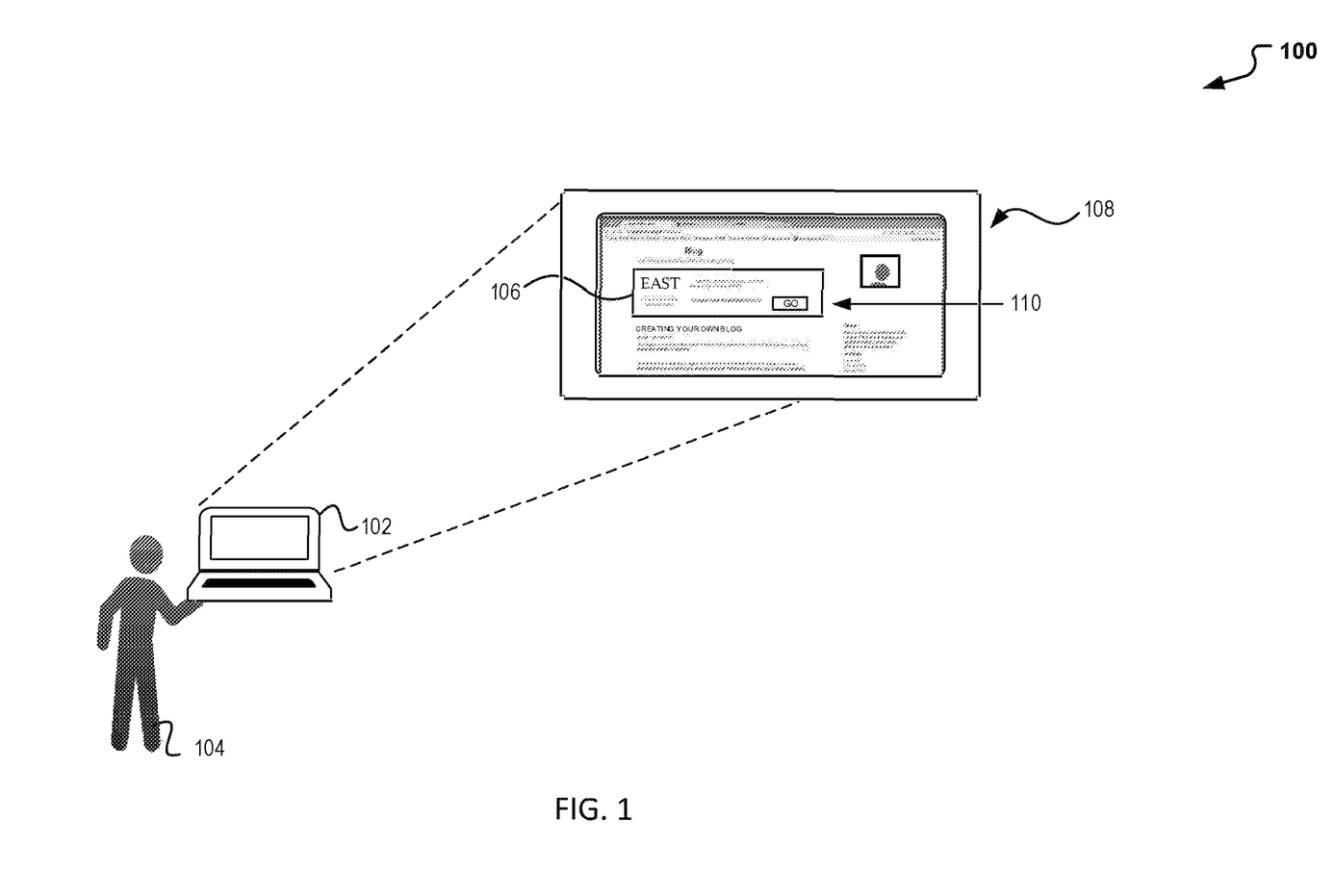
FIG. 1 illustrates a block diagram of a first user receiving an offer while interacting with one or more devices.

An example of this is illustrated in FIG. 1, where a user 104 is interacting with a user device 102. In particular, FIG. 1 illustrates a block diagram 100 of a user 104 receiving an offer 106 while interacting with one or more devices 102. The user device 102 can be a smart phone, tablet, laptop, and other electronic device that may be used for communicating, browsing, purchasing, and the like.

For illustration purposes, a user 104 is presented interacting with a user device 102, engaged in learning how to create a blog from a site 108. The site 108 may include user profile information (e.g., user name and picture), instructions, and other details relevant to the current site 108 visited. In addition, the site 108, may also include advertisements, news articles, and even offers and promotions in the form of a coupon 106. The coupon may be available for use at a different site, with another merchant, after a purchase, etc. Oftentimes, to take advantage of the coupon, the user will be redirected to another site corresponding to the entity offering the discount. As illustrated in FIG. 1, the coupon 106 may be accompanied with a button 110 for redirecting the user 104. However, as indicated, the user may be in the middle of learning a new skill set (e.g., learning how to create a blog) and may not be not interested in leaving the current site. Thus, the user 104 may be left with a decision to forgo the saving presented in order to continue on the current site 108. Therefore, in order to eliminate the need to relinquish such promotion, tokenized offers are introduced that can provide a system and method for saving and accessing such coupon 110 at a later time.

In the current embodiment, a system is presented that is able to communicate with a client member offering the promotion to generate a tokenized offer for later use. The tokenized offer is stored using a token that may be generated in response to an offer acceptance by the user and available for accessing, viewing, and using at a later time. In one embodiment, the tokenized offer may be saved to a digital wallet and/or with a payment provider for later use.

Figure 2:
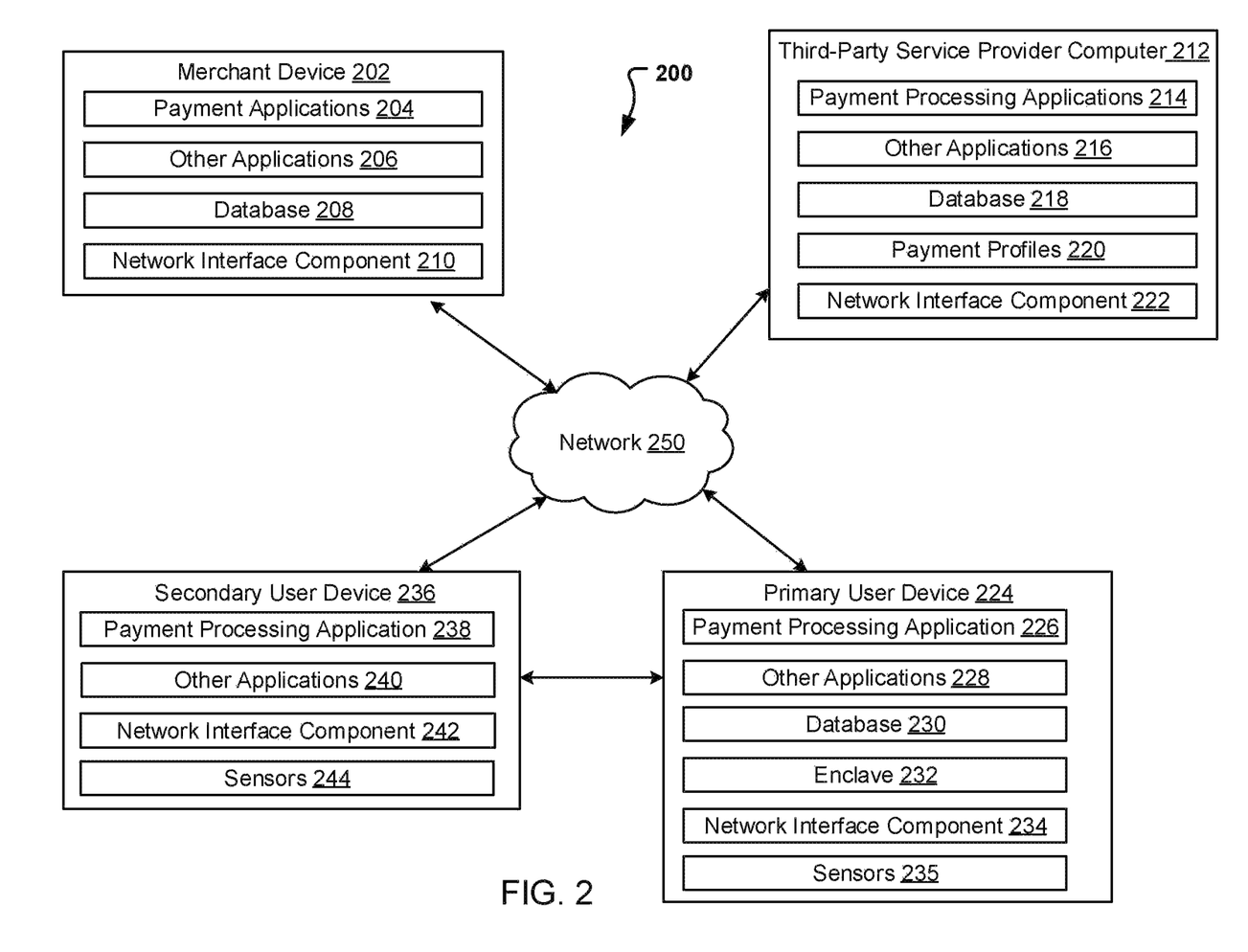
FIG. 2 illustrates a block diagram of a system for tokenizing offers.

FIG. 2 is a block diagram of a networked system 200 for implementing the processes described herein, according to an embodiment. In particular, FIG. 2 illustrates a block diagram of a system 200 for tokenizing offers. System 200 illustrates at least some of the interactions between multiple entities and/or devices for the authentication, use and purchase of a product or service with a merchant in association with a service provider. As shown, system 200 may include or implement a plurality of devices, computers, servers, and/or software components that operate to perform various methodologies in accordance with the described embodiments. It will be appreciated that the devices, computers, and/or servers illustrated in FIG. 2 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 200 includes a merchant device 202, a primary user device 224 (e.g., primary device/trusted primary device 102), a third-party service provider computer 212, and a secondary user device 236 (e.g., secondary device 104) in communication over a network 250. The merchant device 202, primary user device 224, third-party service provider computer 212, and the secondary user device 236 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 200, and/or accessible over network 250.

The merchant device 202 may be implemented as a communication device that may utilize appropriate hardware and software configured for wired and/or wireless communication with the primary user device 224, third-party service provider computer 212, and/or secondary user device 236. For example, the merchant device 202 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 202 may correspond to and be utilized by a user, such as an employee of a merchant and/or another person authorized by the merchant.

The merchant device 202 may include one or more payment applications 204, other applications 206, a database 208, and a network interface component 210. The payment applications 204 and other applications 206 may correspond to executable processes, procedures, and/or applications with associated hardware. In other embodiments, merchant device 202 may include additional or different components having specialized hardware and/or software to perform operations associated with the payment applications 204 and/or the other applications 206.

The payment application 204 may facilitate financial transactions corresponding to the sale of goods and/or services offered by the merchant. For example, the payment application 204 may provide an interface for customers to purchase the goods or services and to receive customer payment information (e.g., customer credit card information). The payment application 204 may further transmit customer payment information to a payment processor (e.g., such as a payment processor corresponding to the third-party service provider computer 212 or the secondary user device 236) to process the customer payment information. The payment application 204 may also facilitate other types of financial transactions such as banking, online payments, money transfer, discount coupon information, and/or the like.

The merchant device 202 may execute the other applications 206 to perform various other tasks and/or operations corresponding to the merchant device 202. For example, the other applications 206 may include security applications for implementing client-side security features, programmatic client applications for interfacing with appropriate application programming interfaces (APIs) over network 250, or other types of applications. The other applications 206 may also include additional communication applications, such as email, texting, voice, and instant messaging (IM) applications that enable a user 106 to send and receive emails, calls, texts, and other notifications through the network 250. In various embodiments, the other applications 206 may include location detection applications, such as a mapping, compass, and/or global positioning system (GPS) applications, which may be used to determine a location of the merchant device 202. The other applications may 206 include social networking applications. Additionally, the other applications 206 may include device interfaces and other display modules that may receive input and/or output information. For example, the other applications 206 may include a graphical user interface (GUI) configured to provide an interface to the user.

The merchant device 202 may further include a database 208, which may be stored in a memory and/or other storage device of the merchant device 202. The database 208 may include, for example, identifiers (IDs) such as operating system registry entries, cookies associated with the payment application 204, tokens, encryption keys, and/or other applications 206, IDs associated with hardware of the network interface component 210, IDs used for payment/user/device authentication or identification, and/or other appropriate IDs. The database 208 may also include information corresponding to one or purchase transactions of customers who have purchased goods or services from the merchant, browsing histories of the customers, or other types of customer information. In certain embodiments, the merchant device 202 may also include information corresponding to payment tokens, such as payment tokens generated by the third-party service provider computer 212 and/or generated by the secondary user device 236.

The merchant device 202 may also include at least one network interface component 210 configured to communicate with various other devices such as the primary user device 224, the third-party service provider computer 212, and/or the secondary user device 236. In various embodiments, network interface component 210 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 212 may be maintained, for example, by a third-party service provider, which may provide payment processing services for the merchant. In one example, the third-party service provider may be provided by PAYPAL®, Inc. of San Jose, CA, USA. Alternatively, the third-party service provider computer 212 may be associated with a user of the primary and secondary device 224, 236. As such, the third-party service provider computer 212 includes one or more payment processing applications 214, which may be configured to process payment information received from the merchant device 202 or from a selection at the primary or secondary user device 224, 236. For example, the payment application 204 of the merchant device 202 may receive payment information from a customer to purchase a service or good offered by the merchant. Upon receipt of the payment information, the payment application 204 may transmit the payment information to the third-party service provider computer 212. The payment processing application 214 of the third-party service provider computer 212 may receive and process the payment information. As another example, the payment application 204 can present a payment code on a display of the user device associated with the merchant. The payment code can be scanned or transmitted to the merchant device 202 for payment processing.

The third-party service provider computer 212 may execute the other applications 216 to perform various other tasks and/or operations corresponding to the third-party service provider computer 212. For example, the other applications 216 may include security applications for implementing client-side security features, programmatic client applications for interfacing with appropriate APIs over the network 250, or other types of applications. The other applications 216 may also include additional communication applications, such as email, texting, voice, and IM applications that enable communication of emails, calls, texts, and other notifications through the network 250. In various embodiments, the other applications 216 may include location detection applications, such as a mapping, compass, and/or GPS applications, which may be used to determine a location of the third-party service provider computer 212. Additionally, the other applications 216 may include device interfaces and other display modules that may receive input and/or output information. For example, the other applications 216 may include a GUI configured to provide an interface to one or more users.

The third-party service provider computer 212 may further include a database 218, which may be stored in a memory and/or other storage device of the third-party service provider computer 212. The database 218 may include, for example, IDs such as operating system registry entries, cookies associated with the payment processing application 214 and/or other the applications 216, IDs associated with hardware of the network interface component 222, IDs used for payment/user/device authentication or identification, and/or other appropriate IDs.

According to a particular embodiment, the third-party service provider computer 212 may include a set of payment profiles 220 corresponding to past sales transactions executed by the merchant device 202 with respect to one or more customers of the merchant. Alternatively, the third-party service provider computer 212 may include a set of merchant payment profiles corresponding to the payment sources associated to a corresponding merchant. For example, a particular payment profile from the set of payment profiles 220 may include payment information corresponding to a particular customer of the merchant and/or a merchant associated with a user. The payment information may include credit card information (e.g., card number, expiration date, security code, card issuer, and/or the like), Automated Clearing House (ACH) information (e.g., account number, routing number, and/or the like), identification information associated with the particular customer/user (e.g., a customer identifier, name, address, phone number, date of birth, and/or the like), billing information, and/or any other type of payment information associated with the particular customer. Furthermore, other payment profiles of the set of payment profiles 220 may include payment information corresponding to other customers of the merchant and/or other merchants associated with the user. In addition, the third-party service provider computer 212 may store the set of payment profiles 220 according to a first file format.

The third-party service provider computer 212 may also store a set of payment tokens corresponding to the set of payment profiles 220. For example, each payment profile of the set of payment profiles 220 may be associated with a corresponding payment token from the set of payment tokens. In some embodiments, each payment profile may include a corresponding payment token from the set of payment tokens. The set of payment tokens may be particular to the third-party service provider computer 212 (e.g., computers from other service providers may be unable to use the set of payment tokens) and may enable the merchant device 202 to more securely process payment transactions with the third-party service provider computer 212. For example, in order to process a payment transaction that involves a credit card number associated with a particular payment profile, the third-party service provider computer 212 may provide the merchant device 202 with a particular payment token that is different from the credit card number. The merchant device 202 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 202.

In various embodiments, the third-party service provider computer 212 also includes at least one network interface component 222 that is configured to communicate with the merchant device 202, the primary user device 224, and/or the secondary user device 236 via the network 250. Further, the network interface component 222 may comprise a DSL modem, a PSTN modem, an Ethernet device, a broadband device, a satellite device and/or various other types of wired and/or wireless network communication devices including microwave, RF, and IR communication devices.

The primary user device 224 may be implemented as a communication device that may utilize appropriate hardware and software configured for wired and/or wireless communication with the merchant device 202, third-party service provider computer 212, and/or the secondary user device 236. The primary user device 224, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 224 may be mobile device 102 communicating with second device 104, a merchant device and/or service provider 212.

The primary user device 224 may include a payment processing application 226 that may be used as a digital wallet that can communicate with a merchant device 202, secondary user device 236, and/or third party service provider 212 for purchasing and transacting. The payment processing application 226, can work jointly with database 230 for retrieving bank account information, user accounts, security codes, tokens that may be associated with various merchant locations. Similarly, the payment processing application, can also provide access to the user profiles for determining which payment method, processing code, to use at a merchant location. The primary user device 224 may include an enclave 232 which can be a secure hardware level storage are designated for the payment processing application 226. The enclave 232 can enable the storage of private and public keys and a randomly generated token that enables the secure communication and validation of the user of the payment processing application with the third party service provider 212.

In one embodiment, the primary device 102 uses a private key and secure token encryption for communicating with the payment processing application 226. The secure token can be pushed in a silent tone in an out of band notification between the payment processing application (e.g., PayPal application) and a server. In other words, when the payment processing application 226 is first installed, two keys are generated, a private key and a public key. The private key is put in the secure enclave 232 and the public key is sent to the database 218 or other server associated with the third-party service provider 212. Therefore, when a user associated with the primary user device 224, first logs into the payment processing application 226, if the login is successful a server associated with the third-party service provider 212 or even a merchant device 202 initiates a silent tone notification to the payment processing application 226. The push notification can be an out-of-band notification which ensures a secure access through the use of the silent tone notification including the transmission of a token. Thus, a request for access from the payment processing application 226, should include the token encrypted which can be decrypted with the public key that was originally transmitted.

The primary user device 224 may also include other applications 228 to perform various other tasks and/or operations corresponding to the primary user device 224. For example, the other applications 228 may facilitate communication with the merchant device 202, such as to receive an indication, from the merchant device 202, to switch payment processing services from the third-party service provider to the service provider. As another example, the other applications 228 may include security applications, application that enable designation of a primary interactive device, and applications that allow for web site searches (including access to merchant websites). The other applications 228 may also include additional communication applications, such as email, texting, voice, and IM applications that enable communication of emails, calls, texts, and other notifications through the network 250. In various embodiments, the other applications 228 may include location detection applications, such as a mapping, compass, and/or GPS applications, which may be used to determine a location of the user device 224. The other applications may 228 social networking applications. Additionally, the other applications 228 may include device interfaces and other display modules that may receive input and/or output information. For example, the other applications 228 may include a GUI configured to provide an interface to one or more users.

The primary user device 224 may further include a database 230, which may be stored in a memory and/or other storage device of the primary user device 224. The database 230 may include, for example, identifiers (IDs) such as operating system registry entries, cookies associated with a web browser and/or the other applications 228, IDs associated with hardware of the network interface component 234, IDs used for payment/user/device authentication or identification, bank information, merchant information, user accounts, and/or other appropriate IDs. In addition, the database 230 may include user identifier information which can be used in conjunction with secondary user device 236 during an explicit code exchange and/or contextual information for web browser authentication.

Primary user device 224, can also be equipped with various sensors 234 to provide sensed characteristics about the primary user device 224 and its environment. For example, the sensors 234 can include a camera for taking images of the surroundings used to determine the information to provide a user. As another example, the sensors 234 can include microphones for receiving audio signals, which can be used to detect location, and other relevant terms that may be spoken. Further, the sensors 234 can include an accelerometer, a light sensor, a biometric sensor, temperature sensor, etc. For example, the biometric sensor can be used to collect a user fingerprint scan. Each type of sensor providing various characteristics about the device, user, or environment.

The primary user device 224 may also include at least one network interface component 110 configured to communicate with various other devices such as the merchant device 202, the third-party service provider computer 212, and/or the secondary user device 236. In various embodiments, network interface component 234 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

As indicated above, a secondary user device 236 (e.g., secondary device 104) may be presently available and used by a consumer (e.g., user 106). The secondary user device 236, much like the primary user device may be equipped with payment processing applications 238 as well as other applications 240. The payment processing applications 238 and other applications 240 may be used to perform various tasks and/or operations corresponding to the secondary user device 236. The other applications 228 may include additional communication applications, such as email, texting, voice, and IM applications that enable communication of emails, calls, texts, and other notifications through the network 250. In addition, the other applications 228 may include location detection applications, such as a mapping, compass, and/or GPS applications, which may be used to determine a location of the secondary user device 236. The other applications may further include 228 social networking applications and device interfaces and other display modules that may receive input and/or output information For example, the applications 238, 240 may facilitate communication with the merchant device 202, such as by presenting a QR code that may be used for making a purchase. As another example, the applications 238, 240 may provide notice of an incoming call or text to the user 106 of the secondary user device 236. Still as another example, the applications 238,240 can provide details and/or login information for authentication by the primary user device 224, with a merchant device 202, or third-party service provider 212.

The secondary user device 236 may also include a network interface component 242 for connecting and interacting with at least primary user device 224, merchant user device 202, and/or third-party service provider computer 212 over network 250. The network interface component 242 may comprise a DSL modem, a PSTN modem, an Ethernet device, a broadband device, a satellite device and/or various other types of wired and/or wireless network communication devices including microwave, RF, and IR communication devices.

The network 250 may be implemented as a single network or a combination of multiple networks. For example, in various embodiments, the network 250 may include the Internet or one or more intranets, landline networks, wireless networks, and/or other appropriate types of networks. Thus, the network 250 may correspond to small scale communication networks, such as a private or local area network, or a larger scale network, such as a wide area network or the Internet, accessible by the various components of system 200.

In addition, the secondary user device 236 can also include sensors 244 that may be used for providing measured information about the user, device, location, environment, etc. The sensors can be used to detect light (is device in a pocket), biometric data (is user working out), location (user is in a meeting, call received), etc. Further, the sensors 244 can also be used to determine proximity between devices and location of interest as well as determine processor usage and/or signal strength relative to other devices including primary user device 224, third party service provider computer 212, and merchant device 202.

Further, system 200 can also include a communication between the secondary user device 236 and/or primary user device 224 with third-party service provider computer 212 for saving and retrieving offers tokenized and stored for later use. To illustrate this communication, FIGS. 3A-3D are presented where a user device 102 used in obtaining tokenized offers. As an example, a third party service provider (e.g., PayPal) will be used store and retrieve the offers. In addition, various offers from numerous merchants will be described however, the details are not so limited as other merchants, websites, discounts, promotions, and service providers may be contemplated.

Figure 3A:
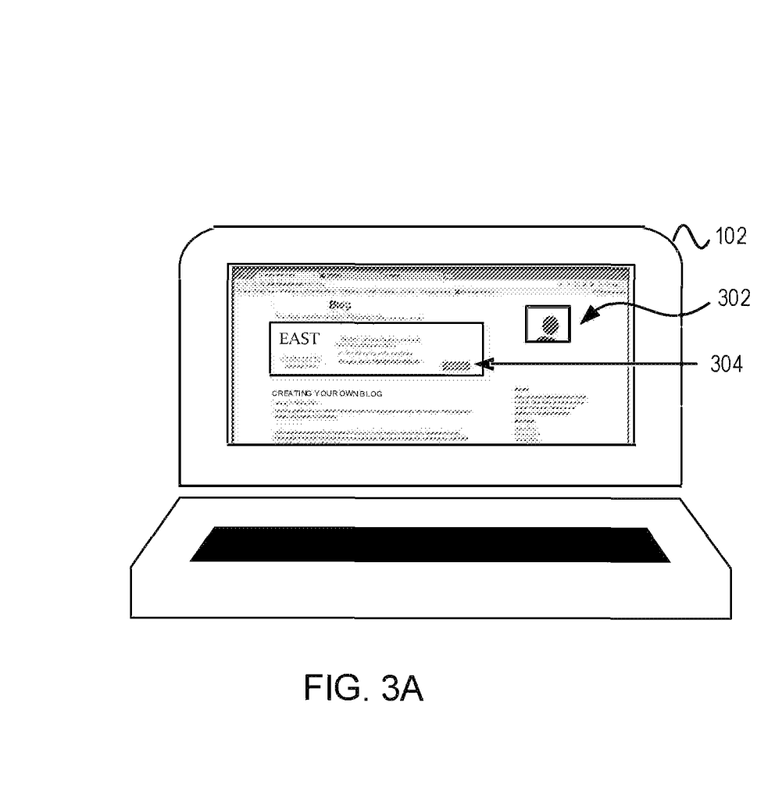
FIGS. 3A-3D illustrate a communication with a user device for obtaining tokenized offers.

FIG. 3A begins with an illustration of a user 102 browsing a site 302 that describes how to create a blog. The site 302 can include, among other things, instructions, user profile information, file history, contact information, etc. Additionally, the site 302 can include advertisements, promotions, coupons, and other offers 304 available for the user 104 to utilize. As example, FIG. 3A illustrates a user 104 browsing site 302 and in particular, user 104 reading an article on creating a blog. During the preview, an offer from a merchant (e.g., East) presenting a coupon 304 with a discount and/or free shipping when a purchase is made.

Note that unlike a conventional system (as illustrated in FIG. 1), coupon 304 presents the user with the option to "Add to Wallet," or "Save to Wallet." In the current embodiment, the Add to Wallet option enable a user to save the promotion for later use. That is to say, unlike conventional systems where the promotion presented is for use at the moment and re-routes the user to a new site, coupon 304 instead enables continual browsing of the current site 302 while saving the coupon 304 for later use.

Figure 3B:
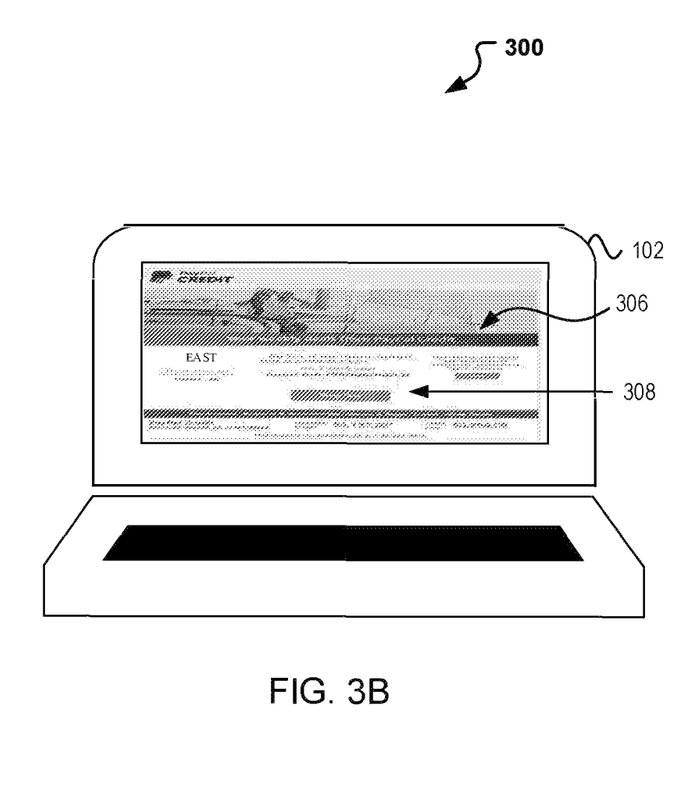

FIG. 3B, presents the payment provider site 304 where a user 104 can retrieve a coupon 304 that was added to wallet at an earlier point in time. As an example, a user 104 is logged into his/her PayPal credit site 306, where in addition to the user information including balance, available credit, etc., the site also illustrates the available coupons the user has added and are available for use. In this instance, the user 104, who was earlier reading about blogging can now retrieve the coupon(s) 304. Upon logging into and/or authenticating at the provider site, as illustrated in FIG. 3B, the save coupon 304 is presented and available for the user. Note that in some instances, the saved coupons 304 may be available on the home site of the provider, in a coupon tab/founder, etc.

Figure 3C:
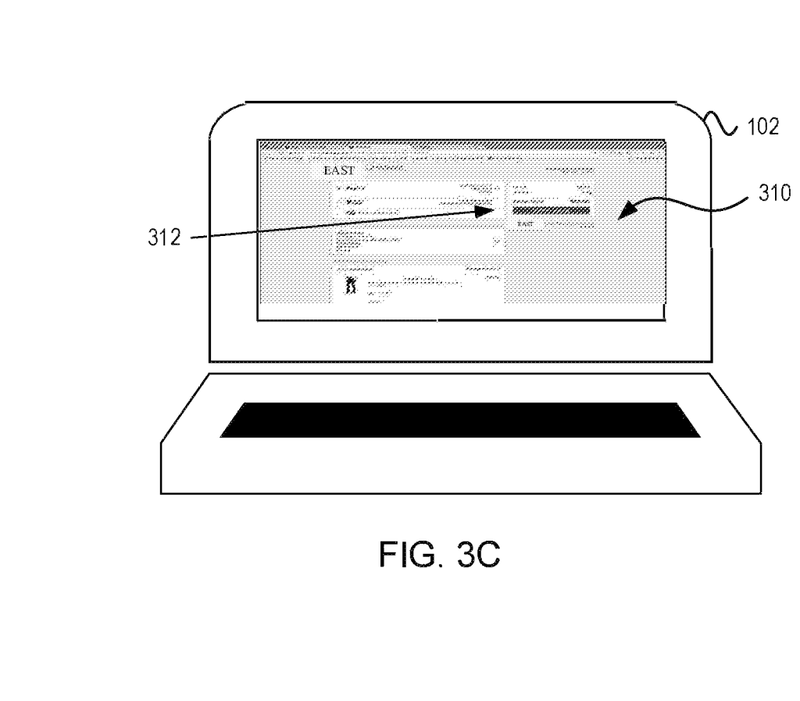

At FIG. 3C, an illustration is given of a user 104 is ready and able to use the saved coupon 304. In particular, FIG. 3C is illustrated where a user 104 is at the merchant site (e.g., East) 310 for purchasing a product. As an example, the user 104 has an interest in purchasing a pair of pants and has been offered free shipping 312 as available on with the saved coupon 304. Note that the merchant site may be visited through the merchant application, via retrieval of the site 310 using an internet service provider, or via the selection of the saved coupon 304 from the provider site 306.

Figure 3D:
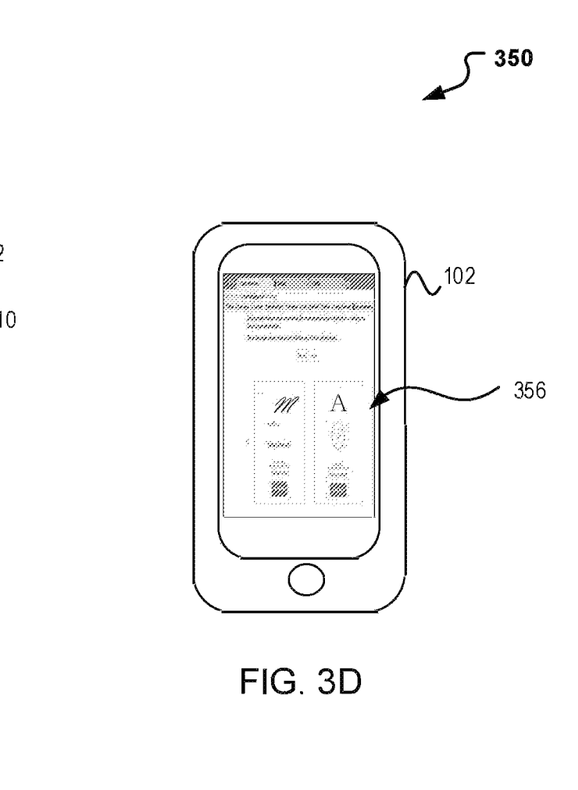

Now turning to FIG. 3D, the provider site 306 is again illustrated where other offers 356 are available and presented to the user 104 for selection and later use. Note that although the offer was presented to the user 104 from a site 302 while the user 104 was browsing, other offers may be available on a digital wallet, from a service provider application, from a merchant site, as well as other sites including but not limited to news sites, learning sites, during video streaming, from a social networking site, etc. In addition, note that the offers 304 are retrievable from any user device including but not limited to a smart phone, tablet, home computer, wearable device, etc.

Figure 4:
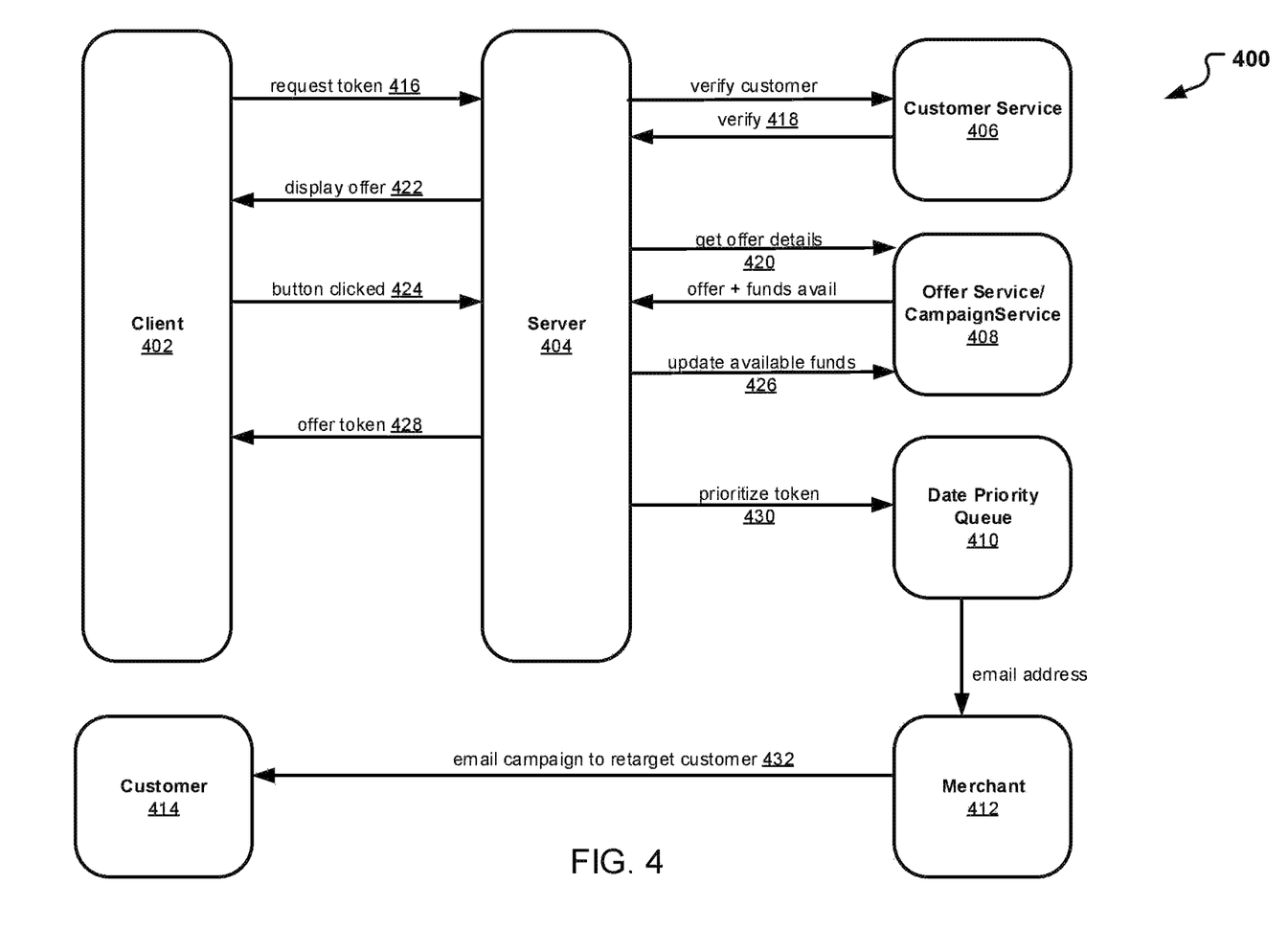
FIG. 4 illustrates a block diagram of communication between devices for tokenizing offers.

FIG. 4 illustrates a timing diagram 400 of the interactions between a client and the service provider for the presentation and storage of a tokenized offer. In FIG. 4, the presentation of a tokenized offer that may be presented to a user 104 and added to a wallet is illustrated. To begin the presentation, a client 402 initiates a communication with a server for an offer related token request 416. In one exemplary embodiment, a client (e.g., East) contacts the payment service provider (e.g., PayPal) for the opportunity to present the offer. The initial contact can include a request for a token 416. In response to the request 416, the server 404 can communicate with a secondary customer service provider 406 or customer service entity, data structure, database or the like, for the verification 418 that the client 402 is an existing customer 418. Additionally, customer verification may also occur at verification 418. During this verification, a merchants restrictions and clients information may be checked to ensure that merchant preferences are met and the customer (e.g., user 104) should be provided with the offer. That is to say, a check on whether the customer is an appropriately targeted customer. For example, a merchant may have a restriction indicating the preference for customers under 25 years old. Verification of customer age may occur prior to offering the token. In addition, a verification that the customer is a customer of the payment provider (e.g., PayPal customer) may occur as well as check for any outstanding risk warnings with the payment provider. Further, a check of customer cookies for relevant advertisements, search history and/or profile information, relationships, and communication on other related applications (e.g., social media) can be considered for verification of the customer.

Once the customer service entity 406 confirms the customer/merchant, the payment provider (e.g., server 404) can grab the offer details 420, that will be surfaced to the customer via the client site. For example, the coupon that will be presented on the news site visited by the customer. The offer details may be obtained from a separate entity, offers service, or campaign service entity 408. Note that the offer service entity 408 may be a separate system, data structure, database, or the like. The offer details can include the offer identification number, the monetary amount to be discounted, the underwriter (e.g., who pays for the offer—payment provider, merchant, etc.), offer dates, expiration, etc. In addition, if the merchant has a campaign or other relationship with the payment provider server 404. The relationship can include a retainer amount that may be provided from the merchant to the payment provider for the use when presenting the offers to the customers. For example, a merchant can provide a payment provider like PayPal with an upfront monetary amount of $500 to surface the offers to customers. Each time a customer clicks on the save to wallet button, a designated amount is pulled from that account. If the offer is used then the funds are used, else if the offer is not used and/or expires then the funds can be returned for use with another customer. Alternatively, if an agreement/campaign does not exist, the payment provider, merchant, or other financial institution may front a percentage or the full amount of the offer.

The designated amount that is pulled from the campaign amount is confirmed available and updated when the offer 422 is presented to the customer 422. In one embodiment, the offer is presented and pushed by the client 402. However, in some instances the offer may be pushed by the merchant, social media site or by other site of relevance to the customer. As illustrated in FIG. 4, one the offer details are verified, the offer is displayed 422 on the client site and if desired by the customer a button clicked 424 (e.g., "Save to Wallet").

A customer (e.g., user 104) interested in the offer through the use of the clicked button 424 will then initiate a communication between the server 404 and the offer services entity 408 for the update of funds 426. The update of funds can include a reduction in the monetary amount held in the campaign amount, an update in a service provider or merchant account (if the amount is fronted by the provider and/or merchant), etc.

Once the funds have been updated, the server 404 can respond to the client 402 with a tokenized offer. The offer along with offer details can be stored in a digital wallet in the user device 102, an internal or external storage unit, and/or other component from which the offer details can be retrieved from. If the customer is a customer of the payment provider (e.g., PayPal user), then the offer can be saved to the PayPal wallet and/or local data storage for local search. Alternatively, the offer can be saved to a local data storage for use and retrieval without the need to be a client, customer, or affiliated with a specific financial institution, payment provider, and/or merchant. Included in the token offer can be the offer details, expiration date, merchant, authenticating information, and other relevant information.

Once the offer token is transmitted 428 to the client, priority information is kept in the server 404 and may be stored in a separate entity such as a date priority queue 410. The data priority queue 410 may prioritize the token and keep track of the corresponding expiration dates. For example, if a token to East is approaching expiration in two days, the customer 414 may be sent emails 432 updating on the soon expiring token. In some instance, in addition to or instead of an email notification, a message, a customized push notification from the merchant 414 and/or the payment provider server 404 (i.e., client and/or PayPal is notified that an offer for a client is soon expiring), an update from the client site, or the like may be sent as a reminder. In one embodiment, the offer may be a short timed offer which can include continuous or interval notifications to the customer 414 via the client site 402 (not shown). For example, a customer 414 may be presented with an offer that has a 30 minute life, notifications may appear as reminders on the client site as the user continues to browse. If the token expires and it was part of a campaign or other agreement, the funds originally pulled for the token may be returned for use with another token offer.

At a later instance, when the user 104 is ready to use the offer, the user 104 (customer 414) may visit the merchant site or open their digital wallet, PayPal app, or other where the offer may be retrieved. In one embodiment, the user may open up the merchant site and the offer may be automatically applied to the purchase at checkout. In another embodiment, when the customer arrives at the merchant's website, a banner, overlay, or notification can pop up reminding the customer to save the offer or that a saved offer is pending and ready to be used. Upon use of the offer, if the merchant 412 is tied to a campaign or other agreement with the payment provider, the offer amount may be reduced from the account or retainer amount. (not shown)

Note that the offers may be surfaced within any web experience, thus anywhere where an advertisement may exist, an offer may similarly exist that may be saved to a wallet. In addition, the offers are also available and applicable to the account at checkout. A rebate may also be presented with money back with purchase. Note that an offer may be provided to any user 104 without the need for a specific membership with the financial institution. In some embodiments, a user may checkout with retrieval of the offer that may be stored locally on the user device 102. Alternatively, the user 104 may user the offer after confirmation of membership with the financial institution or payment provider. If the user 104 is not a member, onboarding may be initiated at checkout.

Figure 5:
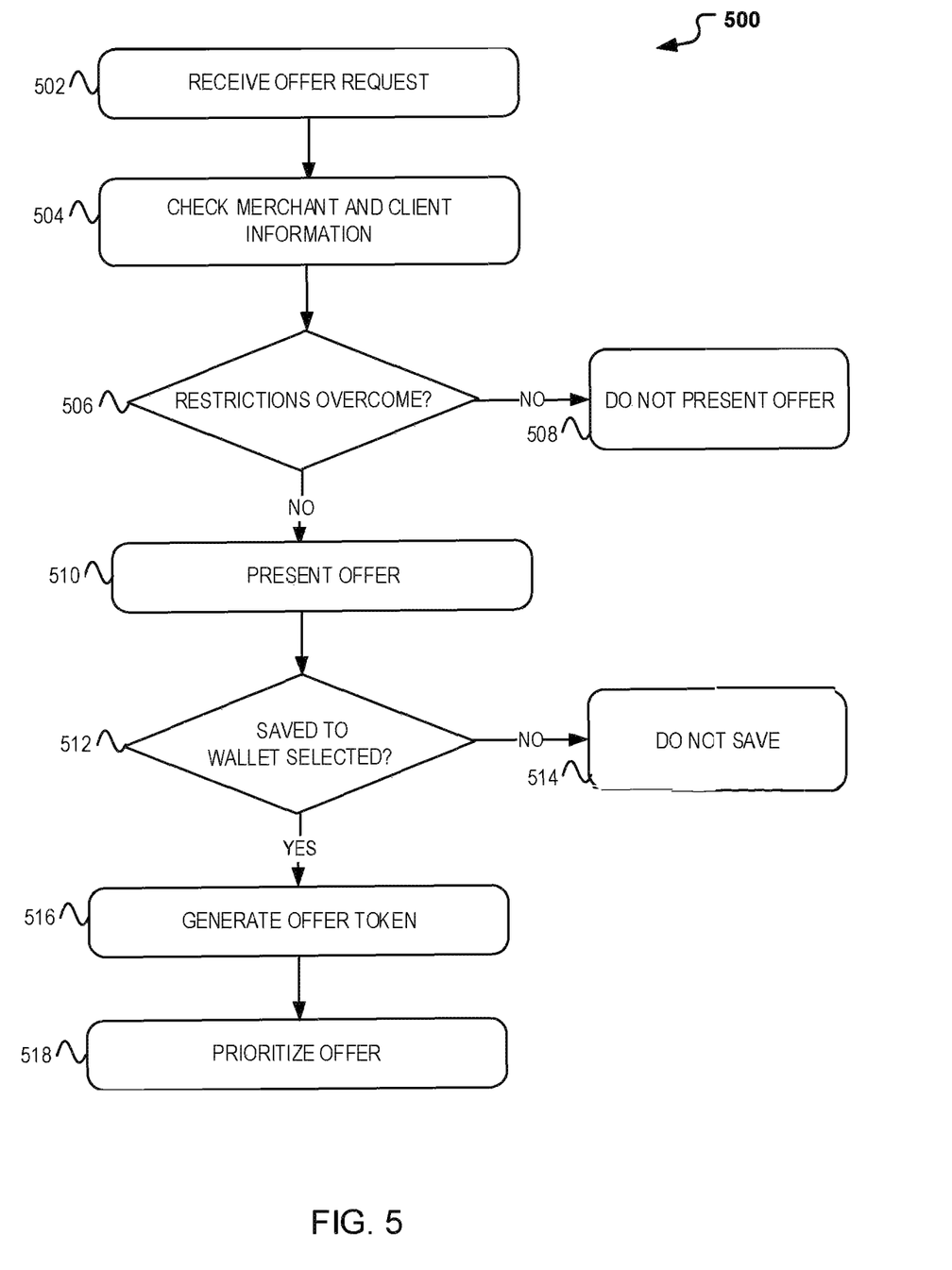
FIG. 5 illustrates a flow diagram for tokenizing offers.

FIG. 5 illustrates example process 500 for implementing a system that provides tokenized offers as computing system 200 of FIG. 2 and/or timing diagram 400 of FIG. 4. In particular, FIG. 5 illustrates a flow diagram illustrating operations for verifying and presenting a customer with a tokenized offer over a client site for saving to a digital wallet. According to some embodiments, process 500 may include one or more of operations 502-518, which may be implemented, at least in part, in the form of executable code stored on a non-transitory, tangible, machine readable media that, when run on one or more hardware processors, may cause a system to perform one or more of the operations 502-518.

Process 500 may begin with operation 502, where a system such a payment provider system and server receive a request for an offer from a client system for an associated site. The offer request received at the server may be affiliated with a merchant, service provider, charity, non-profit, or the like. The offer may come in the form of a coupon presented on the client site for promotions, rebates, discounts, incentives, points, rewards, etc. for use the a user at the merchant.

Once the request is received, the server may communicate with another system, entity, database, data structure or service for the verification of information. The information verification can include verification of the merchant information and customer information. Among other checks, the customer may be checked to verify that merchant restrictions are met, risks are checked, user preferences, search history, and social relationships are checked. The checks can help indicate whether the customer is a good candidate to who the offer should be presented.

If the customer does not meet the predefined restrictions set by the merchant at operation 504, then the offer request may be denied. A denied offer indicates to the client that the offer request may not be fulfilled and the site should not present this offer to the customer. In one embodiment, if the customer does not meet the predefined restrictions, other types of advertisements and even promotions may continue to be displayed on the client site. For example, a customer may be presented with advertisements and even offers that may not include restriction checks or include other restrictions that the current customer meets. Alternatively, if all checks/restrictions are met, then an offer may be displayed on the client site. An exemplary restriction set by the merchant may be age, as the merchant may be targeting an older audience.

At operation 510, a tokenized offer is present on the client site for selection by the user of the user device. Prior to the presentation of the offer, the server may collect offer information (e.g., savings, type, expiration, etc.) as well as check for any associated relationships, campaigns and agreements established by the merchant and the server. If a retainer exists, a predefined amount may be deducted from the account to account for the offer discounts. In some instances, a campaign may not exist in which case the offer amount may be paid for by the server in its entirety or partially as an agreement with the merchant. Further, the tokenized offer may be stored locally in the user device and in a digital wallet affiliated with the server, payment provider, financial institution, merchant, etc. Note that in some instances, the predefined amount may not be deducted until operation 516.

Upon presentation of the tokenized offer to the customer, the customer then has the opportunity to save to wallet. Wishes to forgo the offer, then the offer is not saved. In instances, where the offer is affiliated with a campaign, the monetary amount pulled from the account may be reimbursed for use with another offer. If, however, the user desires to use the offer and selects the button presented to save to wallet, then process 500 continues to operation 516. At operation 516, a token is generated for the offer for later retrieval (locally or remotely through digital wallet) and is prioritized by the server at operation 518. Also, at operation 516 if a retainer exists, a predefined amount may be deducted from the account to account for the offer discounts. In one embodiment, the token generated may be digitally signed by an underwriter (e.g., PayPal) such that it may not be tampered with by a customer. That is to say, if the data is tampered with, then the offer will not work. The token works as a unique code/signature that ties the offer to the customer such that customer targeting if available. Thus, a customer unique identifier is added to the token so that only the designated customer may redeem it. For a customer that does not have an affiliation with the financial institution, payment provider, merchant or the like, other tracking or unique identifiers may be added to the token. For example, the token may include, but is not limited to, a session identification number (ID), tracking ID, social media profile, etc., which can be used to uniquely identity the customer so that the token is not shared.

Prioritizing the offer at operation 518 enables the option to receive notifications via email, messaging, application updates, site notices, and the like, that the offer is soon expiring. The process 500 may then continue again when a user is ready to use and checkout at which point the tokenized offer is presented and applied.

Figure 6:
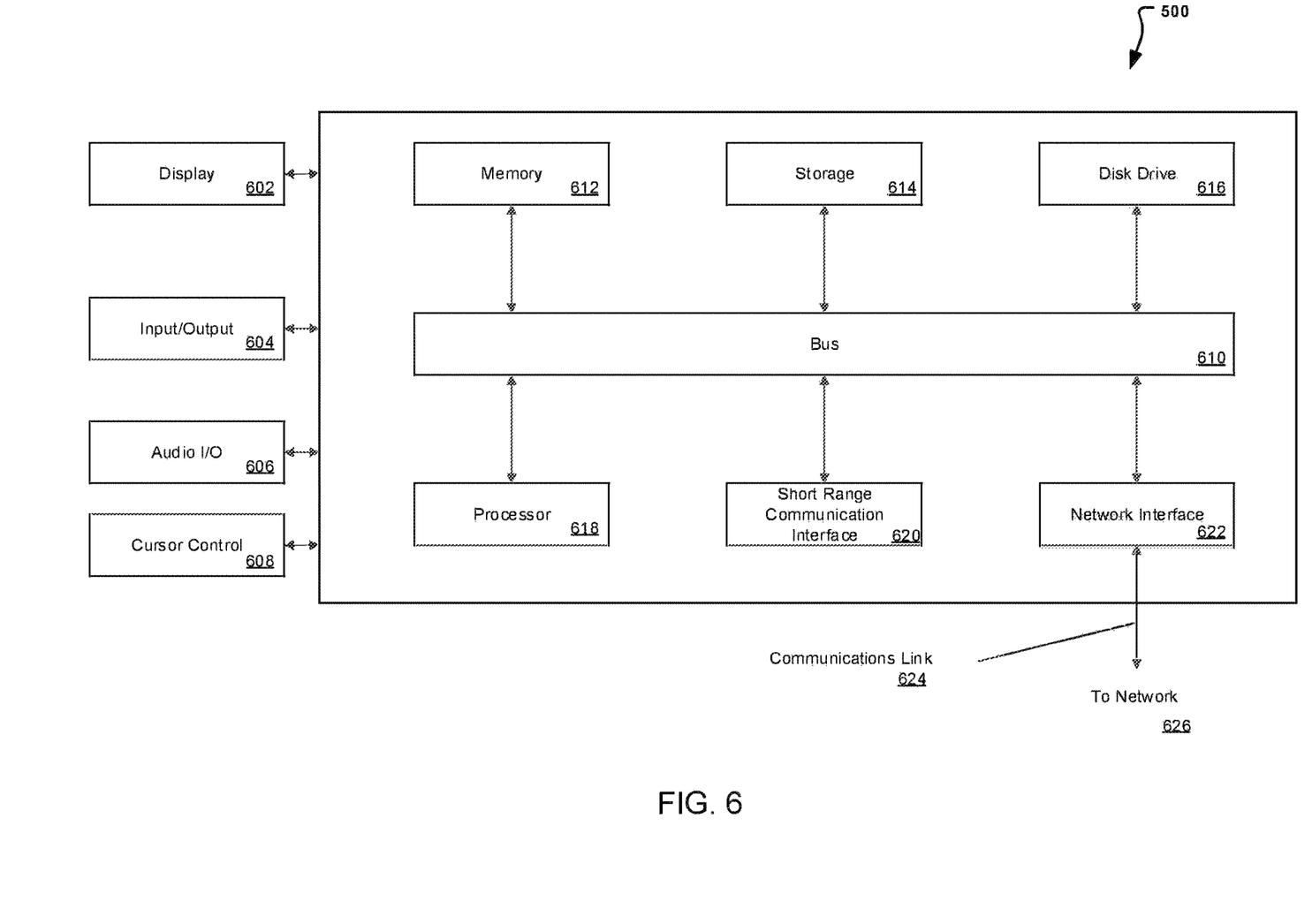
FIG. 6 illustrates an example block diagram of a computer system suitable for implementing one or more devices of the communication systems of FIGS. 2 and 5.

FIG. 6 illustrates an example computer system 600 in block diagram format suitable for implementing on one or more devices of the system in FIG. 2. In various implementations, a device that includes computer system 600 may comprise a personal computing device 102 (e.g., a smart or mobile device, a computing tablet, a personal computer, laptop, wearable device, PDA, etc.) that is capable of communicating with a network 626. A service provider and/or a content provider may utilize a network computing device (e.g., a network server) capable of communicating with the network. It should be appreciated that each of the devices utilized by users 104, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users 104 to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 may include an image sensor for capturing images and/or video, such as a complementary metal oxide semiconductor (CMOS) image sensor, and/or the like. An audio input/output component 606 may also be included to allow a user 108 to use voice for inputting information by converting audio signals. Audio I/O component 606 may allow the user 104 to hear audio. A transceiver or network interface 622 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a microcontroller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component (e.g., ROM), and/or a disk drive 616. Computer system 600 performs specific operations by processor 618 and other components by executing one or more sequences of instructions contained in system memory component 612. Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short range communications interface 620. Short range communications interface 620, in various embodiments, may include transceiver circuitry, an antenna, and/or waveguide. Short range communications interface 620 may use one or more short-range wireless communication technologies, protocols, and/or standards (e.g., WiFi, Bluetooth®, Bluetooth Low Energy (BLE), infrared, NFC, etc.).

Short range communications interface 620, in various embodiments, may be configured to detect other devices (e.g., primary device, secondary device, etc.) with short range communications technology near computer system 600. Short range communications interface 620 may create a communication area for detecting other devices with short range communication capabilities. When other devices with short range communications capabilities are placed in the communication area of short range communications interface 620, short range communications interface 620 may detect the other devices and exchange data with the other devices. Short range communications interface 620 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
a processor configured to execute the instructions to cause the system to perform operations comprising:

determining an interaction between a device and a site of a first entity;
accessing user profile information associated with a user of the device;
based on the user profile information, determining whether the user meets one or more criteria associated with offers that are associated with a second entity different from the first entity, the one or more criteria comprising a browser cookie associated with the device, a search history of the user, or social media communications associated with the user;
based on a determination that the user meets the one or more criteria, receiving an offer of the offers to present to the user of the device;
causing a presenting of the offer on a display of the device;
causing, in response to a user engagement made with respect to the presented offer, the offer to be saved on a local data storage of the device, wherein the causing the offer to be saved comprises generating a token having a token signature that is unique to the saved offer and unique to a session identification number;
determining, after the offer has been saved on the local data storage of the device, that the device is involved in an electronic transaction with the second entity; and
automatically applying the offer to the electronic transaction, wherein the offer is retrieved, after a verification of the token signature, from the local data storage of the device without the user having an account with the second entity.

2. The system of claim 1, wherein the device comprises a wearable device, wherein the offer is presented on the wearable device.

3. The system of claim 1, wherein the offer is a first offer, and wherein the operations further comprise: based on a determination that the user does not meet the one or more criteria, receiving a second offer of the offers, and causing a presenting of the second offer on the display of the device.

4. The system of claim 1, wherein the offer is presented based on sensor data associated with the device.

5. The system of claim 1, wherein the offer includes one of a promotion, points, a discount, or a coupon.

6. The system of claim 1, wherein the offer is determined based on a risk history of the user and the user profile information.

7. The system of claim 1, wherein the operations further comprise: causing the offer to be saved in a digital wallet of the user in addition to the local data storage of the device.

8. The system of claim 1, wherein the site of the first entity includes one of a social media site, a video streaming site, or a merchant site.

9. The system of claim 1, wherein the one or more criteria are specified by the second entity.

10. A method, comprising:
determining that a device of a user is electronically interacting with a website of a first entity;
accessing user profile information associated with the user;
based on the accessed user profile information, determining that the user meets one or more predefined conditions associated with: a web browser cookie associated with the device, a web search history of the user, or social media postings generated by the user via a social media platform;
identifying, based on a determination that the user meets the one or more predefined conditions, a first offer of a plurality of offers from one or more second entities;
causing the first offer to be presented via an interactive mechanism on a display of the device;
detecting a user engagement of the interactive mechanism;
saving, in response to the detected user engagement of the interactive mechanism, the first offer on a local data storage of the device, wherein the saving comprises associating a unique token signature with the first offer, and wherein the unique token signature is further associated with a session identification number;
determining, after the first offer has been saved on the local data storage of the device, that the device is involved in an electronic transaction with the second entity associated with the first offer;
causing, in response to the determining that the device is involved in the electronic transaction, the first offer to be retrieved from the local data storage of the device; and
facilitating, based on a verification of the unique token signature, the electronic transaction at least in part by applying the retrieved first offer to the electronic transaction.

11. The method of claim 10, wherein the first offer is further identified based on one or more specified restrictions, and wherein the unique token signature is generated by a third party that is different from the first entity and the second entity.

12. The method of claim 10, wherein the first offer is presented in response to receiving sensor data associated with the device.

13. The method of claim 10, wherein the device of the user comprises a wearable device, and wherein the first offer is presented on the wearable device.

14. The method of claim 10, wherein the first offer includes one of a promotion, points, a discount, or a coupon.

15. The method of claim 10, wherein the user profile information comprises an age of the user, the web browser cookie of the device, the web search history of the user, or the social media postings generated by the user, and wherein the identifying the first offer is based on a risk history of the user that is a part of the user profile information.

16. The method of claim 10, wherein the first offer is further saved to a digital wallet of the user in addition to the local data storage of the device.

17. The method of claim 10, wherein the website of the first entity includes one of a social media site, a video streaming site, or a merchant site.

18. The method of claim 10, further comprising: pushing a notification to the device, the notification indicating a deadline to accepting or redeeming the first offer.

19. The method of claim 10, wherein the one or more second entities comprise one or more merchants, and wherein at least some of the one or more predefined conditions are specified by the one or more merchants.

20. A non-transitory machine readable medium having stored thereon machine readable instructions executable to cause a machine to perform operations comprising:
determining that a device of a user has interacted with a site of a first entity;
accessing user profile information associated with a user, the user profile information including a search history of the user, a browser cookie of the user, or social media communications of the user;

based on one or more conditions being met by the search history of the user, the browser cookie or the user, or the social media communications associated with the user, determining that the user qualifies as a target audience for receiving one or more offers from a second entity that is different from the first entity;

causing a presentation of the one or more offers on a display of the device;

detecting a predefined user engagement with the one or more offers;

causing the one or more offers to be electronically stored on an electronic storage that is local to the device, wherein the causing the one or more offers to be stored comprises generating a unique token for each of the stored one or more offers, wherein each of the unique tokens identifies an association of the corresponding offer and a session identification number;

determining that the user is conducting an electronic transaction with the second entity;

retrieving, in response to the determining that the user is conducting the electronic transaction, the one or more offers from the electronic storage that is local to the device; and applying, based on a verification of the tokens corresponding to the one or more offers, the one or more offers to the electronic transaction without establishing a user account with the second entity.

\* \* \* \* \*